(12) United States Patent
Flannery

(10) Patent No.: US 11,458,698 B2
(45) Date of Patent: Oct. 4, 2022

(54) INFLATABLE DEVICE REPAIR KIT

(71) Applicant: PB&J, LLC, Marysville, WA (US)

(72) Inventor: John Patrick Flannery, Cottage Grove, OR (US)

(73) Assignee: PB&JJ, LLC, Marysville, WA (US)

( * ) Notice: Subject to any disclaimer, the term of this patent is extended or adjusted under 35 U.S.C. 154(b) by 0 days.

(21) Appl. No.: 17/496,080

(22) Filed: Oct. 7, 2021

(65) Prior Publication Data

US 2022/0161511 A1 May 26, 2022

Related U.S. Application Data

(60) Provisional application No. 63/117,219, filed on Nov. 23, 2020.

(51) Int. Cl.
| | |
|---|---|
| *B29C 73/10* | (2006.01) |
| *B60C 25/00* | (2006.01) |
| *B29C 73/26* | (2006.01) |
| *B29L 30/00* | (2006.01) |

(52) U.S. Cl.
CPC ............. *B29C 73/10* (2013.01); *B60C 25/16* (2013.01); *B29C 2073/262* (2013.01); *B29L 2030/00* (2013.01)

(58) Field of Classification Search
CPC ............. B60C 25/16; Y10T 152/10882; B29C 2073/262; B29C 73/10; B29C 73/00; B29C 73/02
See application file for complete search history.

(56) References Cited

U.S. PATENT DOCUMENTS

| | | | |
|---|---|---|---|
| 2,486,669 | A | 9/1947 | Nassimbene |
| 2,638,955 | A | 7/1949 | Gruber |
| 2,982,683 | A | 11/1953 | Boyce |
| 3,044,524 | A | 9/1959 | Werner et al. |
| 3,133,585 | A | 5/1964 | Iknayan |
| 3,133,586 | A | 5/1964 | Wolfe |

(Continued)

FOREIGN PATENT DOCUMENTS

| | | |
|---|---|---|
| CN | 203293550 | 11/2013 |
| CN | 108819299 | 11/2018 |
| CN | 208914646 | 5/2019 |

OTHER PUBLICATIONS

Translation of CN203293550 (Year: 2013).*
Translation of CN208914646 (Year: 2019).*

*Primary Examiner* — Matthew P Travers
(74) *Attorney, Agent, or Firm* — Jerry Haynes Law

(57) ABSTRACT

An inflatable device repair kit may include an openable repair packet having a patch surface, a sandpaper surface and a packet interior between the patch surface and the sandpaper surface. At least one tube repair patch may be detachably adhered to the patch surface of the repair packet. An abrasive sanding texture may be provided on the sandpaper surface of the repair packet. A patch cement may be provided in the packet interior of the repair packet. The abrasive sanding texture on the repair packet may be used to smoothen an exterior surface on an inflatable device wall of an inflatable device at a break in the inflatable device wall. The repair packet may be opened and the patch cement in the packet interior applied to the tube repair patch and the tube repair patch applied to the inflatable device wall over the break to seal the break.

20 Claims, 4 Drawing Sheets

(56) References Cited

U.S. PATENT DOCUMENTS

| | | | |
|---|---|---|---|
| 3,282,319 A | | 11/1966 | Barnett |
| 4,143,767 A | | 3/1979 | MacDonald |
| 4,358,495 A | * | 11/1982 | Parker .................... E04G 23/02 428/80 |
| 5,643,648 A | | 7/1997 | Kobe et al. |
| 5,714,208 A | * | 2/1998 | Ferrell .................... B29C 73/10 206/229 |
| 2006/0141195 A1 | * | 6/2006 | Haroutoonian ......... B29C 73/10 428/40.1 |
| 2016/0362584 A1 | * | 12/2016 | Quinn .................... D04H 1/587 |
| 2018/0245355 A1 | | 8/2018 | Estereicher |

* cited by examiner

INFLATABLE DEVICE REPAIR KIT

CROSS-REFERENCE TO RELATED APPLICATIONS

This application claims the benefit of U.S. provisional application No. 63/117,219, filed Nov. 23, 2020, and entitled "INNERTUBE REPAIR KIT", which provisional application is hereby incorporated by reference herein in its entirety.

FIELD OF THE INVENTION

The present invention relates generally to an inflatable device repair kit and method for repairing an inflatable device such as an innertube for a pneumatic tire. More so, the present invention relates to an inflatable device repair kit which includes a tube repair patch, patch cement and an abrasive sanding textured surface in a single unitary package.

SUMMARY OF THE INVENTION

Illustrative embodiments of the disclosure are generally directed to an inflatable device repair kit and method for repairing an inflatable device such as an innertube for a pneumatic tire. An illustrative embodiment of the inflatable device repair kit includes a tube repair patch, patch cement and an abrasive sanding textured surface in a single unitary package. The inflatable device repair kit may include an openable repair packet having a patch surface, a sandpaper surface and a packet interior between the patch surface and the sandpaper surface. At least one tube repair patch may be detachably adhered to the patch surface of the repair packet. An abrasive sanding texture may be provided on the sandpaper surface of the repair packet. A patch cement may be provided in the packet interior of the repair packet. The abrasive sanding texture on the repair packet may be used to smoothen an exterior surface on an inflatable device wall of an inflatable device at a break in the inflatable device wall. The repair packet may be opened and the patch cement in the packet interior applied to the tube repair patch and the tube repair patch applied to the inflatable device wall over the break to seal the break.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
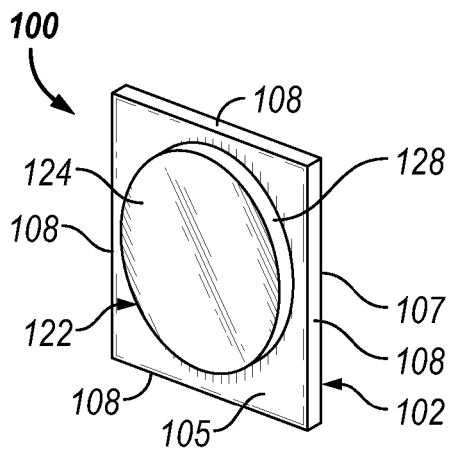
FIG. 1 illustrates a front perspective view of an exemplary inflatable device repair kit with a typical tube repair patch adhered to a front packet wall of a repair packet, in accordance with an embodiment of the present invention.
Figure 2:
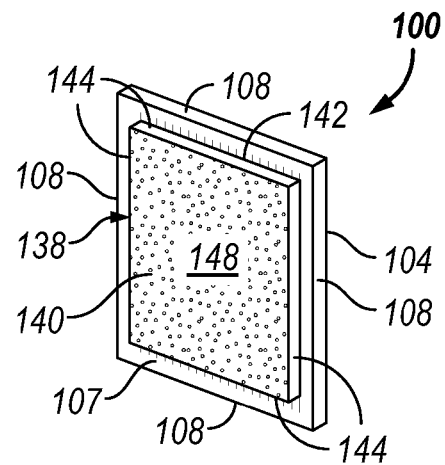
FIG. 2 illustrates a rear perspective view of the exemplary inflatable device repair kit with a sandpaper piece provided on a rear packet wall of the repair packet, in accordance with an embodiment of the present invention.
Figure 3:
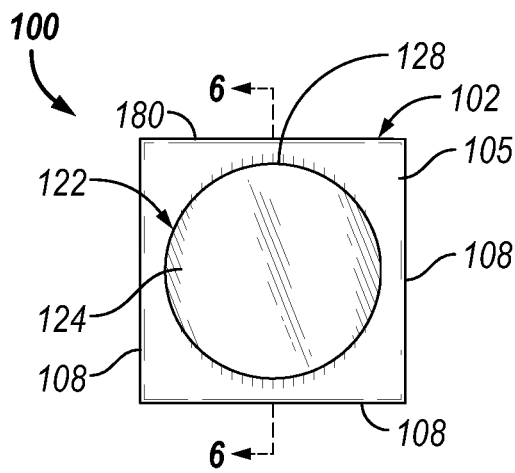
FIG. 3 illustrates a front view of the exemplary inflatable device repair kit, in accordance with an embodiment of the present invention.
Figure 4:
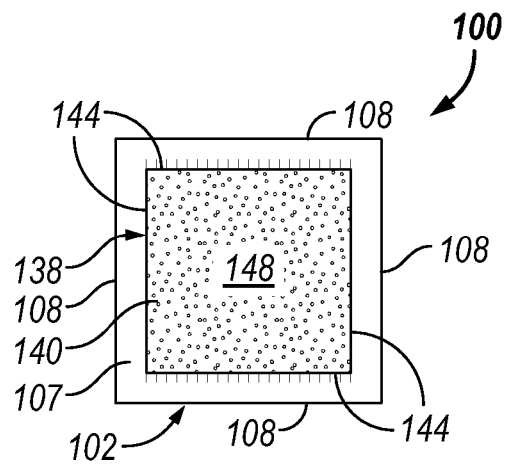
FIG. 4 illustrates a rear view of the exemplary inflatable device repair kit.
Figure 5:
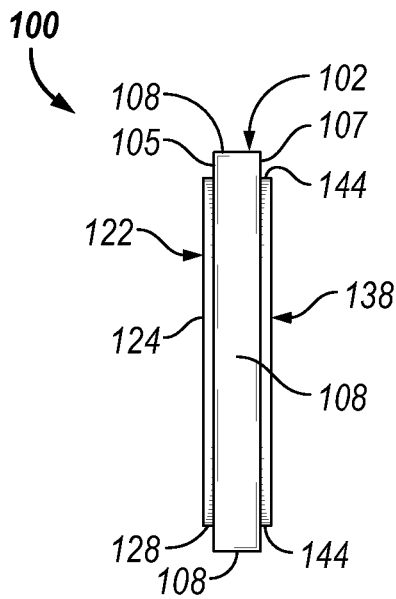
FIG. 5 illustrates a side view of the exemplary inflatable device repair kit.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 11:
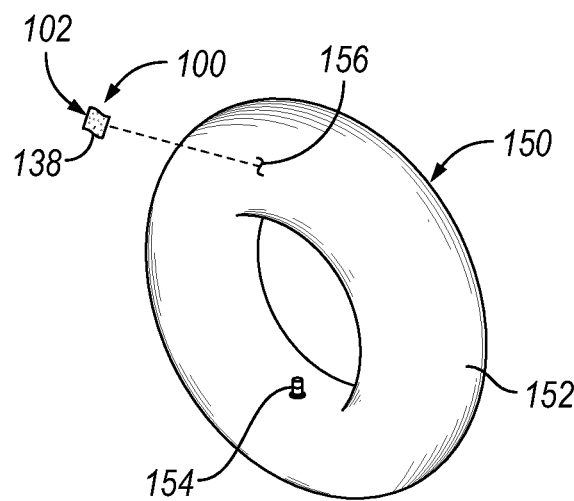
FIG. 11 illustrates a perspective view of a typical inflatable device having a break in the inflatable device wall, preparatory to initial application of the sandpaper piece on the repair packet to the surface of the inflatable device wall having the break in typical application of the inflatable device repair kit.
Figure 12:
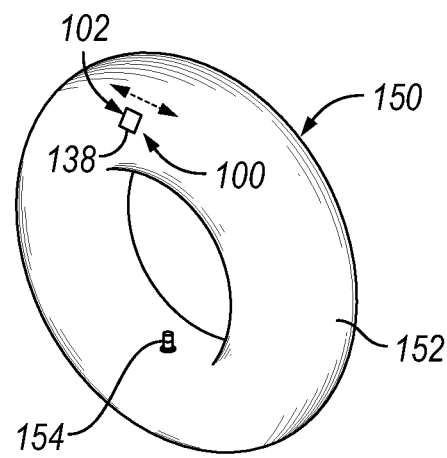
FIG. 12 illustrates a perspective view of the inflatable device shown in FIG. 11, more particularly illustrating typical application of the sandpaper piece on the repair packet to the surface of the inflatable device wall having the break.
Figure 13:
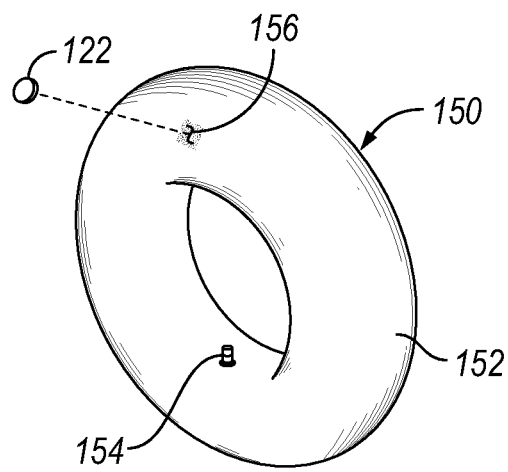
FIG. 13 illustrates a perspective view of the inflatable device, preparatory to application of the tube repair patch to the surface of the inflatable device wall having the break.
Figure 14:
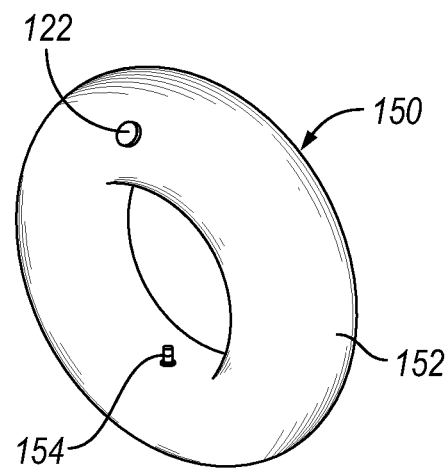
FIG. 14 illustrates a perspective view of the inflatable device, after application of the tube repair patch to the surface of the inflatable device wall to seal the break.
Figure 15:
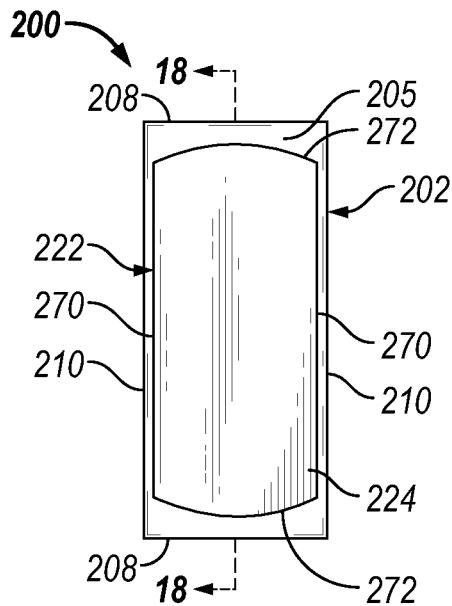
FIG. 15 illustrates a front view of an alternative exemplary embodiment of the inflatable device repair kit, having an elongated tube repair patch.

An inflatable device repair kit 100 and method for repairing an inflatable device 150 (FIGS. 11-14) is referenced in FIGS. 1-14. The inflatable device repair kit 100, hereafter "kit 100", is configured to facilitate repair of a break 156 (FIG. 11) in the inflatable device wall 152 of an inflatable device 150 such as an innertube for a pneumatic tire, for example and without limitation, by application of a tube repair patch 122 to the inflatable device wall 152 over the break 156, as illustrated in FIGS. 13 and 14 and will be hereinafter described. The kit 100 may further be configured to facilitate sanding and smoothening of the inflatable device wall 152 preparatory to application of the tube repair patch 122, typically as illustrated in FIGS. 11 and 12 and will be hereinafter described.

Figure 6:
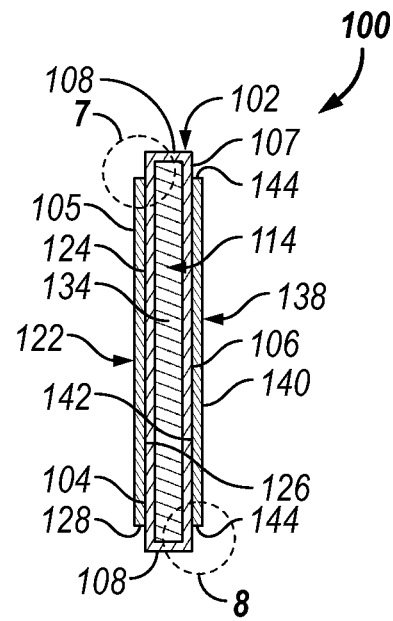
FIG. 6 illustrates a sectional view, taken along section lines 6-6 in FIG. 3, of the exemplary inflatable device repair kit with patch cement filling the packet interior of the repair packet.
Figure 7:
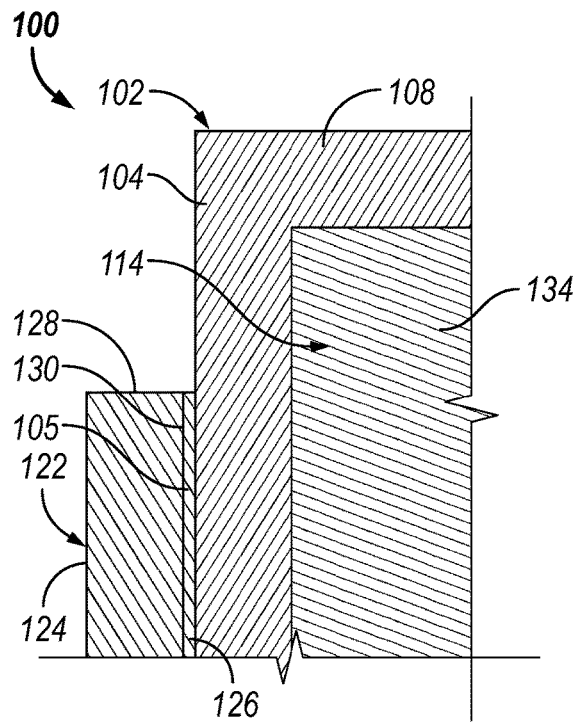
FIG. 7 illustrates an enlarged sectional view, taken at section line 7 in FIG. 6, with the tube repair patch attached to the front packet wall of the repair packet via a patch adhesive.
Figure 8:
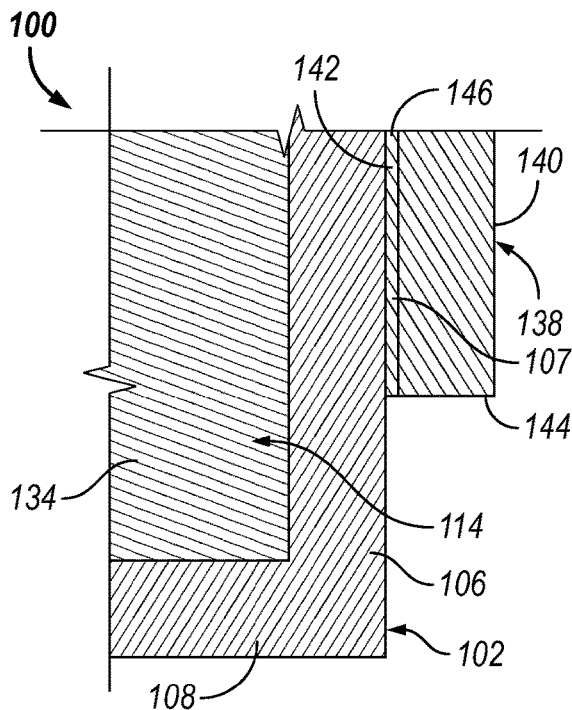
FIG. 8 illustrates an enlarged sectional view, taken at section line 8 in FIG. 6, with the sandpaper piece attached to the rear packet wall of the repair packet via a sandpaper adhesive.
Figure 9:
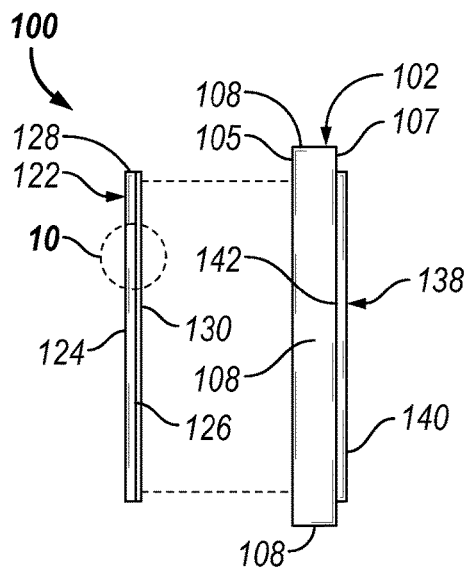
FIG. 9 illustrates an exploded side view of the exemplary inflatable device repair kit, more particularly illustrating typical detachment of the tube repair patch from the front packet wall of the repair packet in typical application of the inflatable device repair kit.
Figure 10:
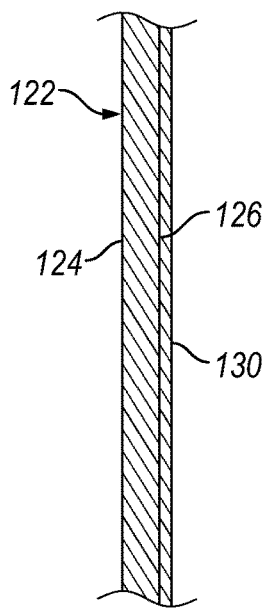
FIG. 10 illustrates an enlarged sectional view of the tube repair patch, taken at section line 10 in FIG. 9.

As illustrated in FIGS. 1-10, the inflatable device repair kit 100 may include an openable repair packet 102. As illustrated in FIGS. 6-8, the repair packet 102 may include a front packet wall 104 and a rear packet wall 106. At least one packet edge 108 may attach the rear packet wall 106 to the front packet wall 104.

In some embodiments, the repair packet 102 may have a polygonal shape with a plurality of packet edges 108. For example, and without limitation, in some embodiments, the repair packet 102 may be square shaped with four packet edges 108, as illustrated. In other embodiments, the repair packet 102 may be circular, elliptical, or oval with a single, continuous packet edge 108.

As further illustrated in FIGS. 6-8, a packet interior 114 may be formed by and between the front packet wall 104, the rear packet wall 106 and the packet edge or edges 108. A liquid patch cement 134 may be provided in the packet interior 114. The patch cement 134 may include any type of adhesive material which is suitable to sealingly secure the tube repair patch 122 to the inflatable device wall 152 of the inflatable device 150. For example, and without limitation, in some embodiments, the patch cement 134 may include a rubber cement which is known by those skilled in the art. Rubber cement is a mixture of solid rubber in a volatile solvent. Upon application of the cement, the solvent evaporates and leaves rubber such as natural rubber, gum mastic or gum Arabic as the adhesive. Some formulations of rubber cement may include n-heptane.

The repair packet 102 may have a construction which facilitates opening of the repair packet 102 to facilitate removal of at least a portion of the patch cement 134 from the packet interior 114. For example, and without limitation, in some embodiments, the repair packet 102 may have a foil construction. In other embodiments, the repair packet 102 may be paper, plastic and/or other tear-able or openable material. In some embodiments, the front packet wall 104, the rear packet wall 106, the packet edge or edges 108 and/or other components of the repair packet 102 may include perforations which facilitate removal or tearing away of a portion of the repair packet 102 to form an opening through which the patch cement 134 can be removed from the packet interior 114 and applied to the tube repair patch 122 preparatory to application of the tube repair patch 122 to the inflatable device 150. In some embodiments, the perforations may be provided in the front packet wall 104 where the patch adhesive 130 attaches the inner patch surface 126 of the tube repair patch 122 to the patch surface 105 on the front packet wall 104 of the repair packet 102. Accordingly, the front packet wall 104 may be torn along the perforations upon detachment of the tube repair patch 122 from the patch surface 105.

The front packet wall 104 of the repair packet 102 may have an exterior patch surface 105. At least one tube repair patch 122 may be detachably adhered to the patch surface 105 of the repair packet 102. As illustrated in FIG. 7, the tube repair patch 122 may have an outer patch surface 124 and an inner patch surface 126. At least one patch edge 128 may circumscribe the outer patch surface 124 and the inner patch surface 126 of the tube repair patch 122. In some embodiments, a patch adhesive 130 may attach the inner patch surface 126 of the tube repair patch 122 to the patch surface 105 of the front packet wall 104.

The tube repair patch 122 may be fabricated of fabric, rubber, other flexible materials, or combinations thereof according to the knowledge of those skilled in the art. In some embodiments, the tube repair patch 122 may include unidirectional or multidirectional reinforcing fibers which reinforce the strength of the tube repair patch 122 in one or multiple directions.

In some embodiments, the repair packet 102 may be circular, elliptical, or oval with a single, continuous packet edge 108. In other embodiments, the repair packet 102 may have a polygonal shape with a plurality of packet edges 108. For example, and without limitation, in some embodiments, the repair packet 102 may be square shaped with four packet edges 108.

The rear packet wall 106 of the repair packet 102 may have an exterior sandpaper surface 107. The exterior sandpaper surface 107 on the rear packet wall 106 may have an abrasive sanding texture 148. In some embodiments, at least one sandpaper piece 138 may be provided on the sandpaper surface 107. As illustrated in FIG. 8, the sandpaper piece 138 may have an outer sandpaper piece surface 140 and an inner sandpaper piece surface 142. The abrasive sanding texture 148 may be provided on the outer sandpaper piece surface 140 of the sandpaper piece 138. The abrasive sanding texture 148 may include any type of abrasive sandpaper coating material which may be applied to the sandpaper surface 107 on the rear packet wall 106 of the repair packet 102 or to the outer sandpaper piece surface 140 of the sandpaper piece 138, according to the knowledge of those skilled in the art.

In some embodiments, the sandpaper piece 138 may be circular, elliptical, or oval with a single, continuous sandpaper edge 144. In other embodiments, the sandpaper piece 138 may have a polygonal shape with a plurality of sandpaper edges 144. For example, and without limitation, in some embodiments, the sandpaper piece 138 may be square shaped with four sandpaper edges 144, as illustrated.

The repair packet 102 of the kit 100 may have any of various sizes. For example, and without limitation, in some embodiments, each packet edge 108 of the repair packet 102 may have a length of 3 cm. The tube repair patch 122 may have a width or diameter of 2.5 cm. Each sandpaper edge 144 of the sandpaper piece 138 may have a length of 2 cm. In other embodiments, the repair packet 102, the tube repair patch 122 and the sandpaper piece 138 of the kit 100 may have other sizes or dimensions.

As further illustrated in FIG. 8, in some embodiments, the sandpaper piece 138 and the repair packet 102 may be fabricated separately. A sandpaper adhesive 146 may attach the inner sandpaper piece surface 142 of the sandpaper piece 138 to the sandpaper surface 107 on the rear packet wall 106 of the repair packet 102. The sandpaper adhesive 146 may include any type of adhesive material or combination of adhesive materials sufficient to resist shear forces and ensure that the sandpaper piece 138 remains attached to the sandpaper surface 107 throughout application of the abrasive sanding texture 148 to the inflatable device wall 152 of the inflatable device 150 preparatory to application of the tube repair patch 122 to the inflatable device wall 152 in repair of the break 156, typically as will be hereinafter described. In some embodiments, the sandpaper piece 138 may be formed integrally with the rear packet wall 106 of the repair packet 102 according to the knowledge of those skilled in the art.

In one aspect, shown in FIGS. 1-10, the kit 100 comprises:

an openable repair packet 102 having a patch surface 105, a sandpaper surface 107 and a packet interior 114 between the patch surface 105 and the sandpaper surface 107;

at least one tube repair patch 122 detachably adhered to the patch surface 105 of the repair packet 102;

an abrasive sanding texture 148 on the sandpaper surface 107 of the repair packet 102; and a patch cement 134 in the packet interior 114 of the repair packet 102.

In another aspect, the openable repair packet 102 may include a tear-able repair packet 102.

In another aspect, the tear-able repair packet 102 may include a foil repair packet 102.

In another aspect, a patch adhesive 130 may attach the tube repair patch 122 to the patch surface 105 of the repair packet 102.

In another aspect, the at least one tube repair patch 122 may include a plurality of tube repair patches 122.

In another aspect, at least one sandpaper piece 138 may be provided on the sandpaper surface 107 of the repair packet 102, and the abrasive sanding texture 148 may be provided on the sandpaper piece 138.

In another aspect, a sandpaper adhesive 146 may attach the sandpaper piece 138 to the sandpaper surface 107 of the repair packet 102.

In another aspect, the repair packet 102 may be square-shaped.

One objective of the present invention is to provide an all-in-one inflatable device repair kit 100 which includes a tube repair patch 122, patch cement 134 and an abrasive sanding texture 148 in a single unitary package.

Another objective is to allow for ease in carrying an inflatable device repair kit 100 for repair of a break 156 in an inflatable device 150.

Another objective is to provide an inflatable device repair kit 100 having at least one tube repair patch 122 of any desired size and shape.

Yet another objective is to provide an inflatable device repair kit 100 in which each tube repair patch 122 has its own dedicated supply of patch cement 134.

Yet another objective is to provide an inflatable device repair kit 100 which ensures that the patch cement 134 remains liquid until the tube repair patch 122 is applied to the inflatable device 150.

Yet another objective is to provide an inflatable device repair kit 100 which is suitable for repairing a break 156 in a bicycle inflatable device 150.

As FIGS. 1-10 illustrate, the inflatable device repair kit 100 may include a flexible, openable repair packet 102. The repair packet 102 may have a front packet wall 104, an exterior patch surface 105 on the front packet wall 104, a rear packet wall 106, an exterior sandpaper surface 107 on the rear packet wall 106 and a packet interior 114 between the front packet wall 104 and the rear packet wall 106. At least one tube repair patch 122 may be detachably adhered to the exterior patch surface 105 on the front packet wall 104 of the repair packet. 102. At least one sandpaper piece 138 may be provided on the exterior sandpaper surface 107 on the rear packet wall 106 of the repair packet 102. A patch cement 134 may be provided in the packet interior 114 of the repair packet 102.

In some embodiments, the openable repair packet 102 may include a tear-able repair packet 102 such as foil, for example and without limitation. A patch adhesive 130 may attach the tube repair patch 122 to the patch surface 105 of the repair packet 102.

In some embodiments, the at least one tube repair patch 122 may include a plurality of tube repair patches 122. The tube repair patches 122 may be layered or adjacent to each other on the patch surface 105. The at least one sandpaper piece 138 may include a plurality of sandpaper pieces 138. A sandpaper adhesive 146 may attach the sandpaper piece 138 to the sandpaper surface 107 of the repair packet 102. The repair packet 102 may be square-shaped or may have any other polygonal shape, or may be circular, elliptical, or oval.

Referring next to FIGS. 11-14 of the drawings, in typical application, the kit 100 may be used to repair a break 156 in the inflatable device wall 152 of an inflatable device 150 such as a bicycle inflatable device, for example and without limitation. Accordingly, the abrasive sanding texture 148 on the sandpaper surface 107 of the repair packet 102 may initially be applied with pressure against the exterior surface of the inflatable device wall 152 at the break 156 while moving the repair packet 102 in a back-and-forth or circular motion. This action smoothens the surface if the inflatable device wall 152 for subsequent application of the tube repair patch 122 to the inflatable device wall 152 over the break 156.

The tube repair patch 122 may be removed from the repair packet 102 by detaching the patch adhesive 130 (FIG. 7) from the patch surface 105 on the front packet wall 104 of the repair packet 102. The repair packet 102 may be torn open as the tube repair patch 122 is removed from the repair packet 102, or alternatively, by manually tearing or puncturing the repair packet 102. The patch cement 134 may be squeezed or otherwise removed from the packet interior 114 and applied to the inner patch surface 126 of the tube repair patch 122. The tube repair patch 122 may then be applied against the sanded and smoothened surface on the inflatable device wall 152 at the break 156 with the applied patch cement 134 sandwiched between the tube repair patch 122 and the inflatable device wall 152. The patch cement 134 may be allowed to dry such that the tube repair patch 122 imparts an airtight seal over the break 156. Accordingly, an air pump (not illustrated) may be attached to a valve stem 154 on the inflatable device 150 and operated to inflate the inflatable device 150, typically in the conventional manner.

Referring next to FIGS. 15-18 of the drawings, an alternative illustrative embodiment of the inflatable device repair kit is generally indicated by reference numeral 200. In the kit 200, elements which are analogous to the respective elements of the kit 100 that was heretofore described with respect to FIGS. 1-14 are designated by the same respective numerals in the 200-299 series in FIGS. 15-18. The repair packet 202 and the tube repair patch 222 of the kit 200 may be elongated. Accordingly, the repair packet 202 may be rectangular with a pair of packet end edges 208. A pair of elongated, parallel, spaced-apart packet side edges 210 may extend between the packet end edges 208. The tube repair patch 222 of the kit 200 may have a pair of end patch edges 272. A pair of elongated, parallel, spaced-apart side patch edges 270 may extend between the end patch edges 272.

Figure 16:
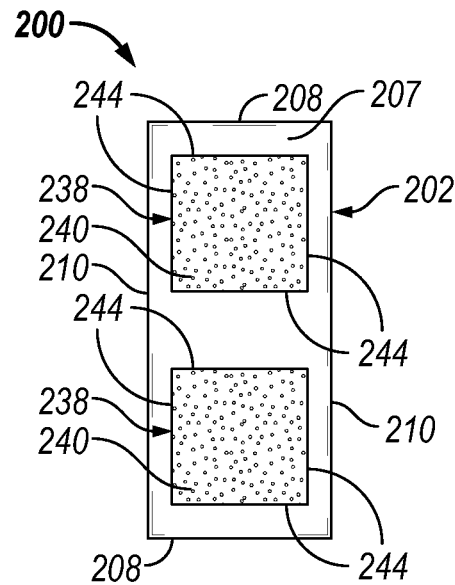
FIG. 16 illustrates a rear view of the exemplary inflatable device repair kit shown in FIG. 15, with a pair of sandpaper pieces provided on the rear packet wall of the repair packet.
Figure 17:
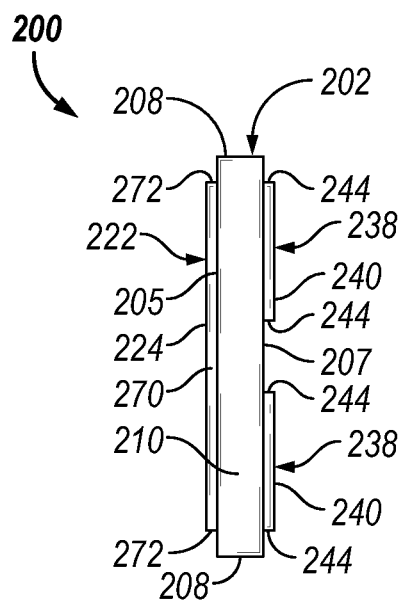
FIG. 17 illustrates a side view of the exemplary inflatable device repair kit shown in FIG. 15.
Figure 18:
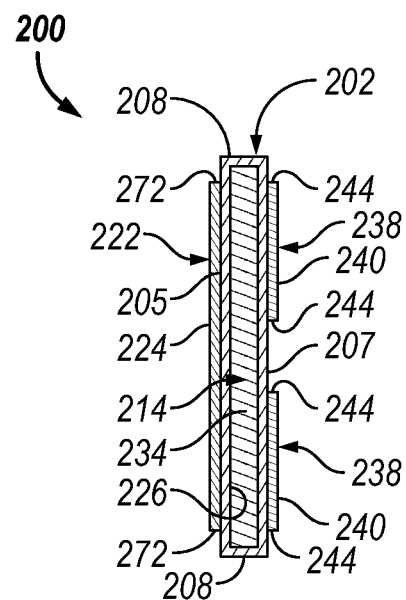
FIG. 18 illustrates a sectional view of the exemplary inflatable device repair kit shown in FIG. 15, taken along section lines 18-18 in FIG. 15.

As illustrated in FIG. 16, at least one sandpaper piece 238 may be provided on the sandpaper surface 207 of the repair packet 202. In some embodiments, a pair of sandpaper pieces 238 may be provided on the sandpaper surface 207, as illustrated. Each sandpaper piece 238 may be square, as illustrated, or may have any other polygonal or non-polygonal shape.

The repair packet 202 of the kit 200 may have any of various sizes. For example, and without limitation, in some embodiments, each packet end edge 208 of the repair packet 202 may have a length of 3 cm, whereas each packet side edge 210 of the repair packet 202 may have a length of 6 cm. Each side patch edge 270 of the tube repair patch 222 may have a length of 5.5 cm, and each end patch edge 272 of the repair patch 222 may have a length of 2.5 cm. Each sandpaper edge 244 of each sandpaper piece 238 may have a length of 2 cm. In other embodiments, the repair packet 202, the tube repair patch 222 and each sandpaper piece 238 of the kit 200 may have other sizes or dimensions.

Application of the kit 200 may as be heretofore described with respect to the kit 100 in FIGS. 11-14. The elongated tube repair patch 222 may be used to repair an elongated or large break 156 (FIG. 11) in the inflatable device wall 152 of the inflatable device 150.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An inflatable device repair kit, the inflatable device repair kit comprising:
    an openable repair packet having a patch surface, a sandpaper surface and a packet interior between the patch surface and the sandpaper surface, wherein the patch surface and the sandpaper surface face externally from the packet interior;
    at least one tube repair patch detachably adhered to the patch surface of the repair packet;
    an abrasive sanding texture on the sandpaper surface of the repair packet; and
    a patch cement in the packet interior of the repair packet.

2. The inflatable device repair kit of claim 1, wherein the openable repair packet comprises a tear-able repair packet.

3. The inflatable device repair kit of claim 2, wherein the tear-able repair packet comprises a foil repair packet.

4. The inflatable device repair kit of claim 1, further comprising a patch adhesive attaching the at least one tube repair patch to the patch surface of the repair packet.

5. The inflatable device repair kit of claim 1, wherein the at least one tube repair patch comprises a plurality of tube repair patches.

6. The inflatable device repair kit of claim 1, further comprising at least one sandpaper piece on the sandpaper surface of the repair packet, and wherein the abrasive sanding texture is on the at least one sandpaper piece.

7. The inflatable device repair kit of claim 6, further comprising a sandpaper adhesive attaching the at least one sandpaper piece to the sandpaper surface of the repair packet.

8. The inflatable device repair kit of claim 1, wherein the repair packet is square-shaped.

9. An inflatable device repair kit, the inflatable device repair kit comprising:
    a flexible, openable repair packet having a first packet wall, an exterior patch surface on the first packet wall, a second packet wall, an exterior sandpaper surface on the second packet wall and a packet interior between the first packet wall and the second packet wall, wherein the exterior patch surface and the exterior sandpaper surface face externally from the packet interior;
    at least one tube repair patch detachably adhered to the exterior patch surface of the repair packet;
    at least one sandpaper piece on the exterior sandpaper surface of the repair packet; and
    a patch cement in the packet interior of the repair packet.

10. The inflatable device repair kit of claim 9, wherein the openable repair packet comprises a tear-able repair packet.

11. The inflatable device repair kit of claim 10, wherein the tear-able repair packet comprises a foil repair packet.

12. The inflatable device repair kit of claim 9, further comprising a patch adhesive attaching the at least one tube repair patch to the patch surface of the repair packet.

13. The inflatable device repair kit of claim 9, wherein the at least one tube repair patch comprises a plurality of tube repair patches.

14. The inflatable device repair kit of claim 9, wherein the at least one sandpaper piece comprises a plurality of sandpaper pieces.

15. The inflatable device repair kit of claim 9, wherein the repair packet is square-shaped.

16. The inflatable device repair kit of claim 9, further comprising a sandpaper adhesive attaching the at least one sandpaper piece to the sandpaper surface of the repair packet.

17. An inflatable device repair kit, the inflatable device repair kit comprising:
    an elongated, rectangular, flexible, openable repair packet having a first packet wall, an exterior patch surface on the first packet wall, a second packet wall, an exterior sandpaper surface on the second packet wall and a packet interior between the first packet wall and the second packet wall, wherein the exterior patch surface and the exterior sandpaper surface face externally from the packet interior;
    an elongated tube repair patch detachably adhered to the exterior patch surface of the repair packet;
    at least one sandpaper piece on the exterior sandpaper surface of the repair packet; and
    a patch cement in the packet interior of the repair packet.

18. The inflatable device repair kit of claim 17, wherein the openable repair packet comprises a tear-able repair packet.

19. The inflatable device repair kit of claim 18, wherein the tear-able repair packet comprises a foil repair packet.

20. The inflatable device repair kit of claim 17, wherein the at least one sandpaper piece comprises a pair of sandpaper pieces.

\* \* \* \* \*